United States Patent [19]
Nygren, Jr.

[11] Patent Number: 5,695,306
[45] Date of Patent: Dec. 9, 1997

[54] FUSIBLE MEMBER CONNECTION APPARATUS AND METHOD

[75] Inventor: William D. Nygren, Jr., Denver, Colo.

[73] Assignee: Lockheed Martin Corp., Bethesda, Md.

[21] Appl. No.: 646,588

[22] Filed: May 8, 1996

[51] Int. Cl.$^6$ .............................. F16B 37/08; F16B 39/36
[52] U.S. Cl. .......................... 411/433; 411/267; 411/434; 29/426.4
[58] Field of Search .......................... 411/19, 267, 270, 411/432, 433, 434, 909; 29/426.4

[56] References Cited

U.S. PATENT DOCUMENTS

| | | |
|---|---|---|
| 2,840,404 | 6/1958 | Weber, Jr. . |
| 3,334,536 | 8/1967 | Armstrong .............................. 411/434 |
| 3,405,598 | 10/1968 | Kriesel . |
| 3,910,154 | 10/1975 | Gardner .............................. 411/434 |
| 3,926,090 | 12/1975 | Bunker .............................. 411/434 |
| 4,410,293 | 10/1983 | Elias et al. . |
| 4,929,135 | 5/1990 | Delarue et al. .............................. 411/267 X |
| 5,160,233 | 11/1992 | Mckinnis . |
| 5,221,171 | 6/1993 | Rudoy et al. . |
| 5,248,233 | 9/1993 | Webster . |
| 5,282,709 | 2/1994 | Chaput et al. . |
| 5,378,100 | 1/1995 | Fullerton . |

OTHER PUBLICATIONS

Bill Purdy, "Advanced Release Technologies Program Report" Naval Research Lab, 16 pages.
C&H Technology, Inc. Technical Data Sheet Model 9421-2 Non-explosive Separation Nut, 5 pages.
Fokker Thermal Knife Description Sheet, 1 page.
Starsys Research. Co., Brochure for High Output Parraffin Linear Motors, 4 pages.
TiNi Alloy Co., Product Information Sheet for Frangibolt 2 pages.

Primary Examiner—Neill R. Wilson
Attorney, Agent, or Firm—Sandeep Seth

[57] ABSTRACT

A connection apparatus utilizes a structural element made of fusible material supported directly in the connection load path of the device. A carrier mechanism is axially translatably supported in the device and utilizes a connecting member to connect two desired structures. The connection mechanism engages and holds the connecting member in a first axial position. In one embodiment, the connection mechanism releases the connecting member when translated to a second axial position. In another embodiment the connection mechanism tensions the connection when translated to the a second axial position. The fusible member is heated to transition from solid to liquid. In the liquid state, the fusible member no longer opposed axial load on the carrier mechanism. The fusible alloy comprises a low melting temperature alloy, such as bismuth-lead or bismuth-tin.

21 Claims, 8 Drawing Sheets

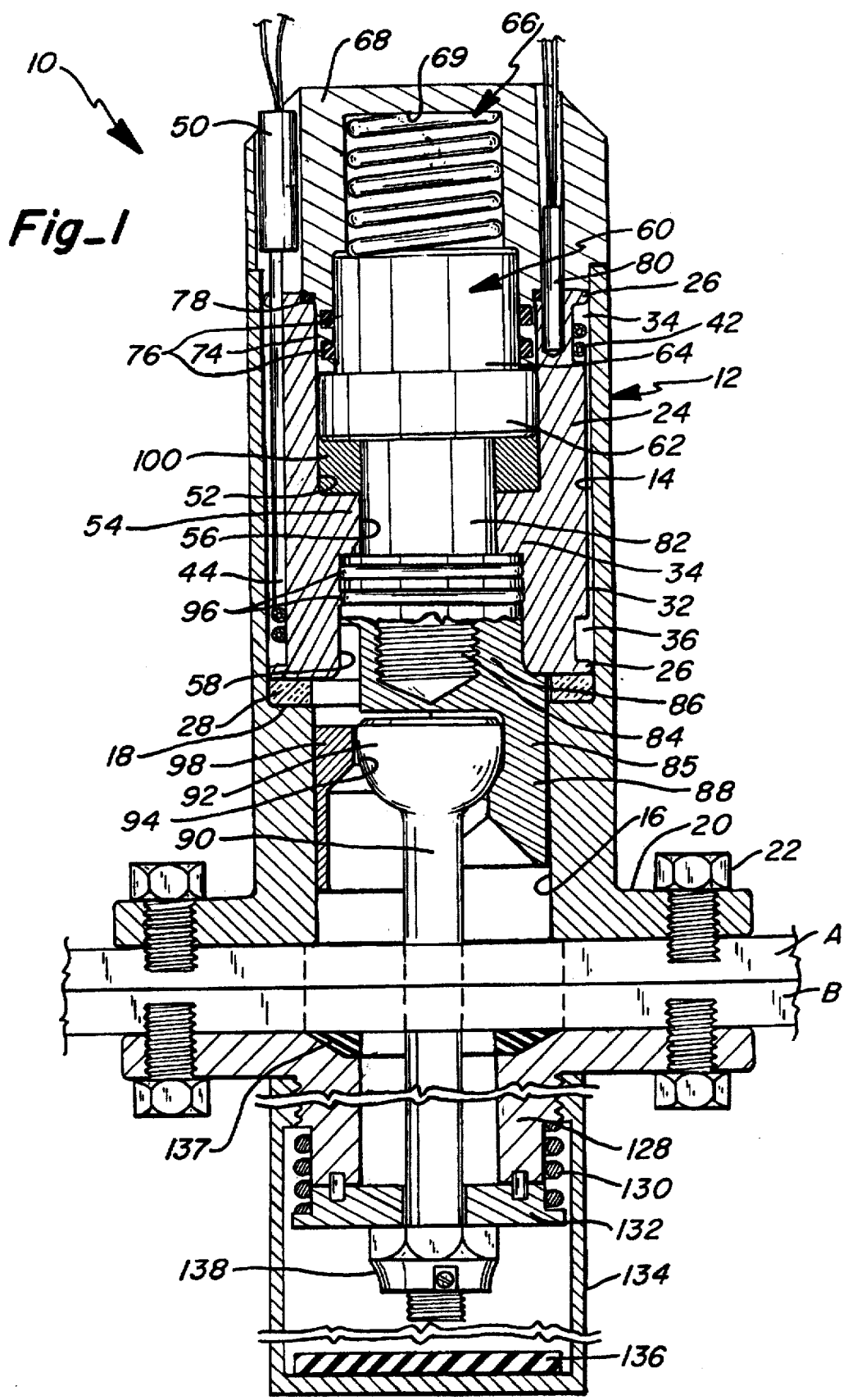
Fig_1

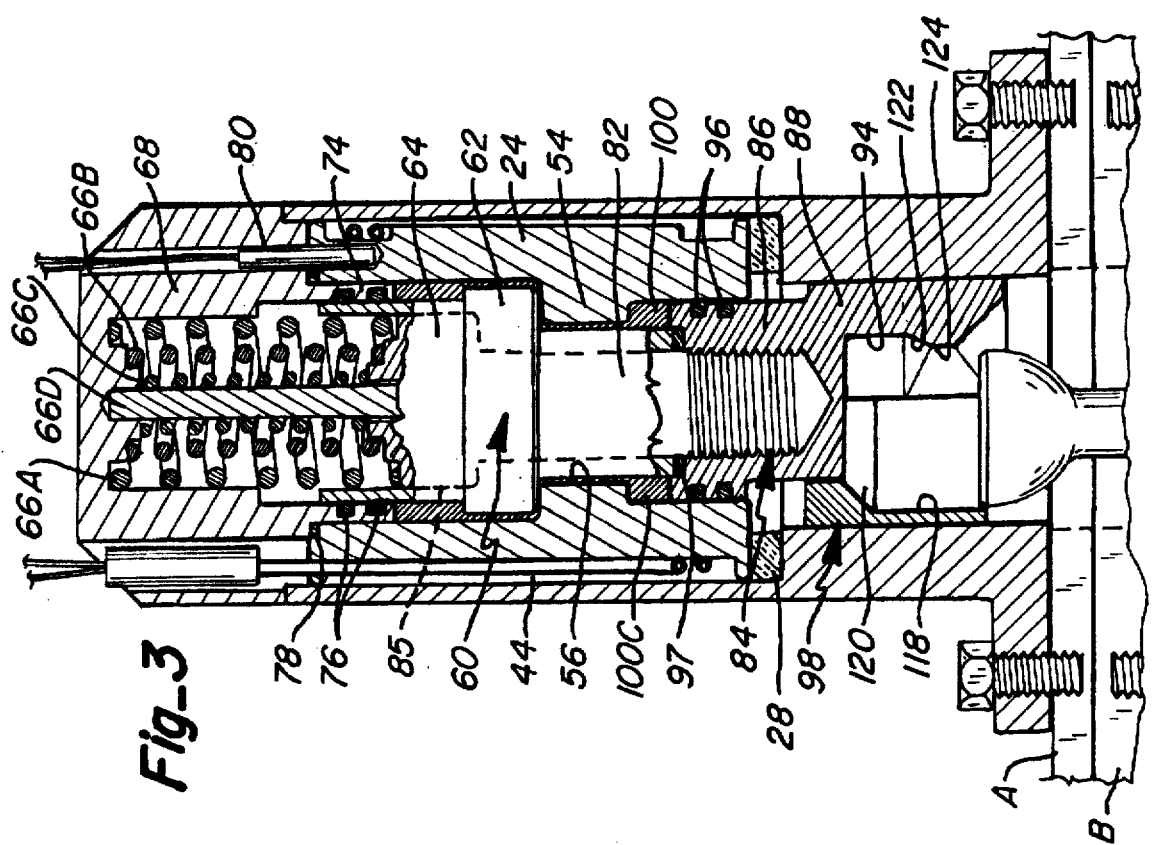
Fig._3
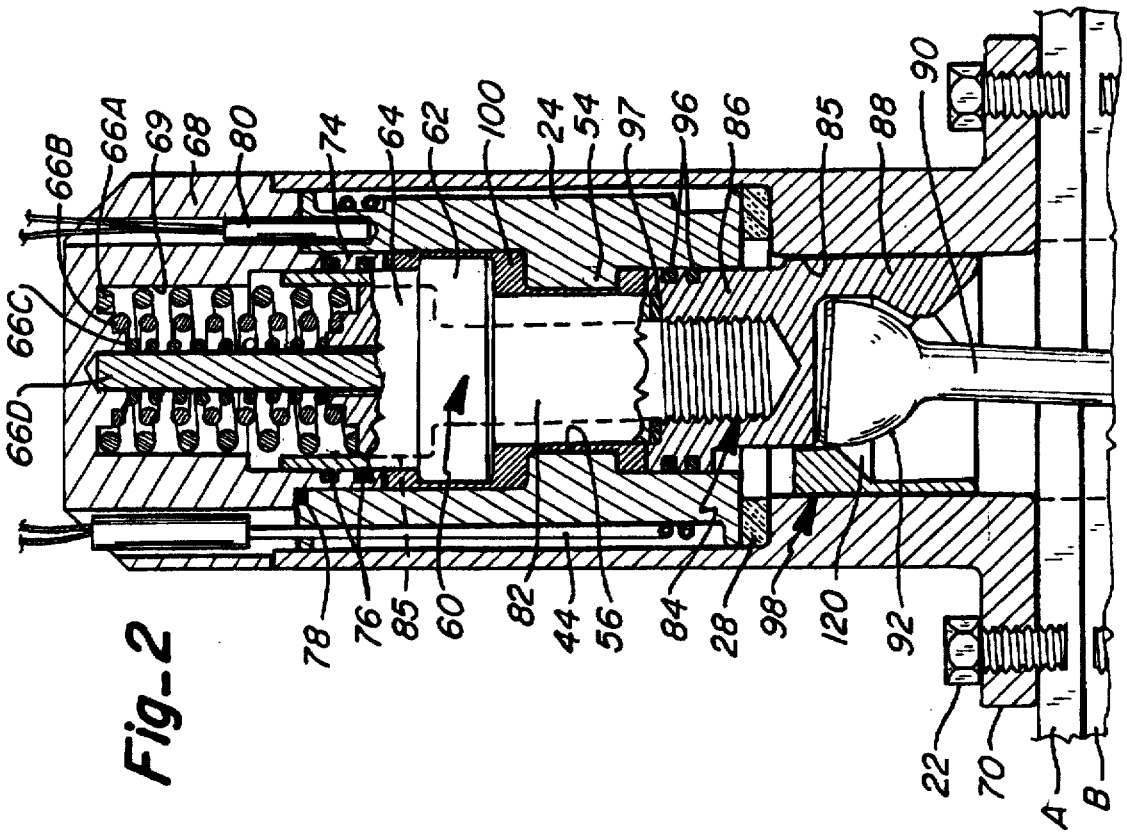
Fig._2

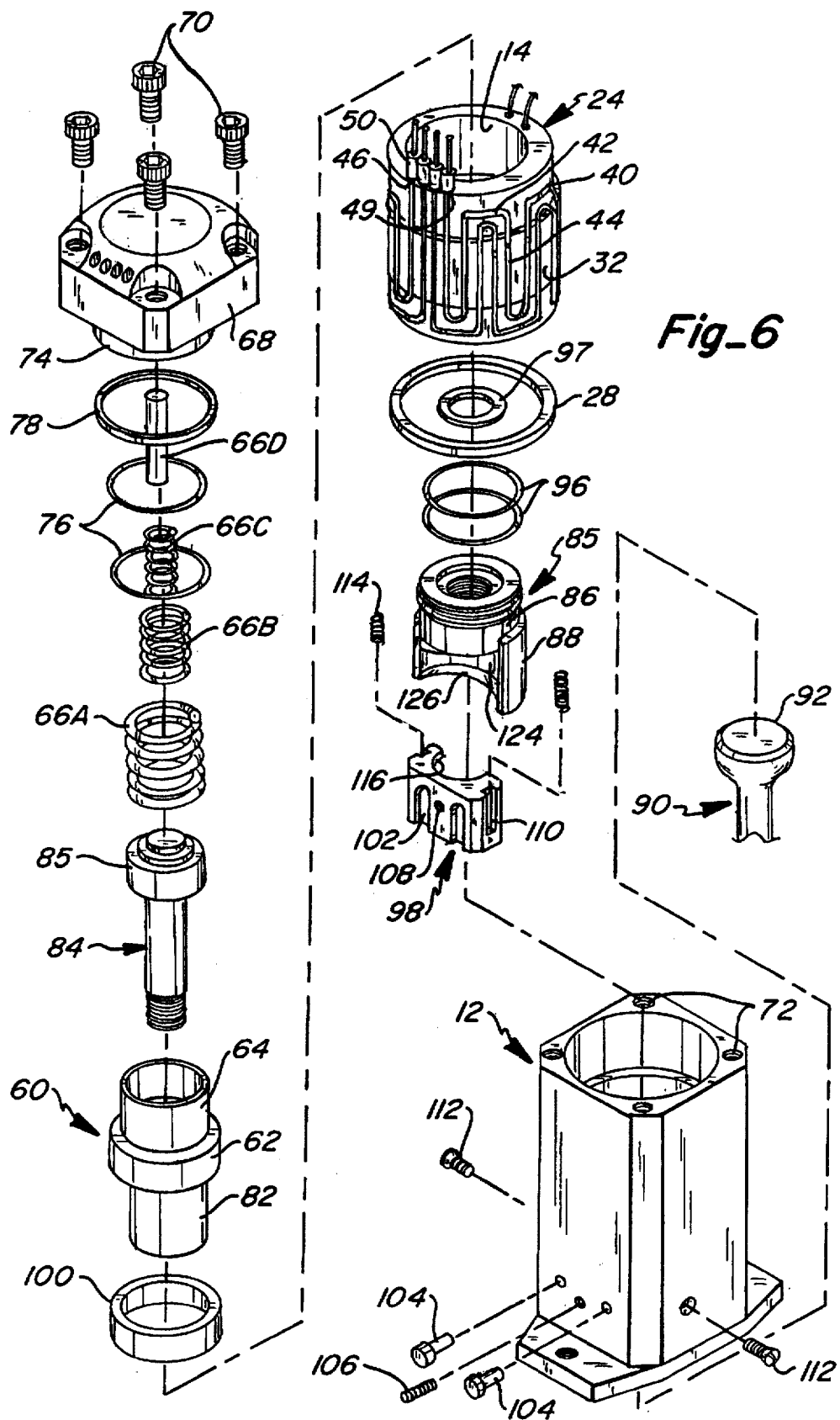

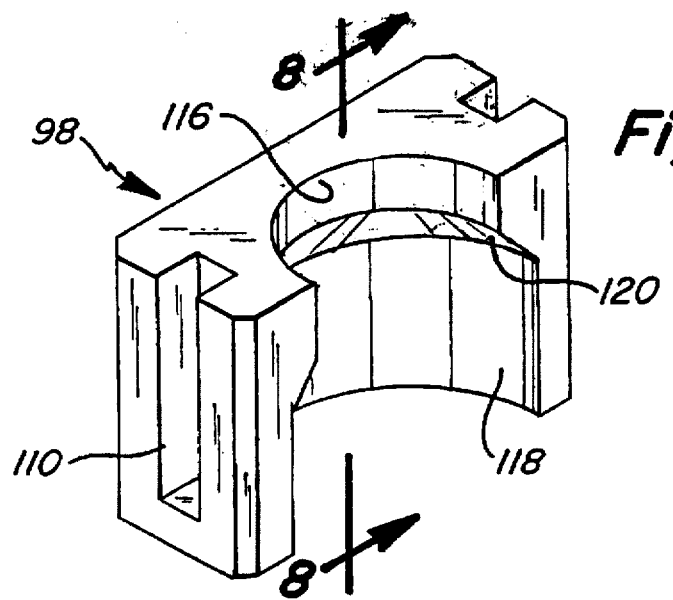
Fig_7
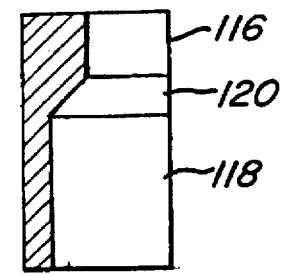
Fig_8
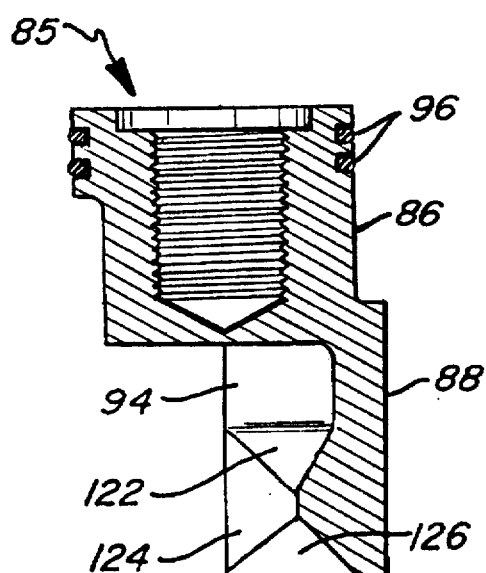
Fig_10
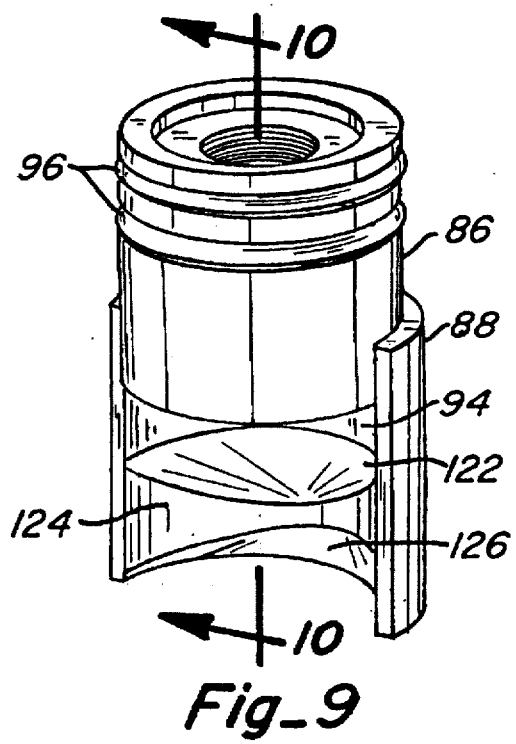
Fig_9

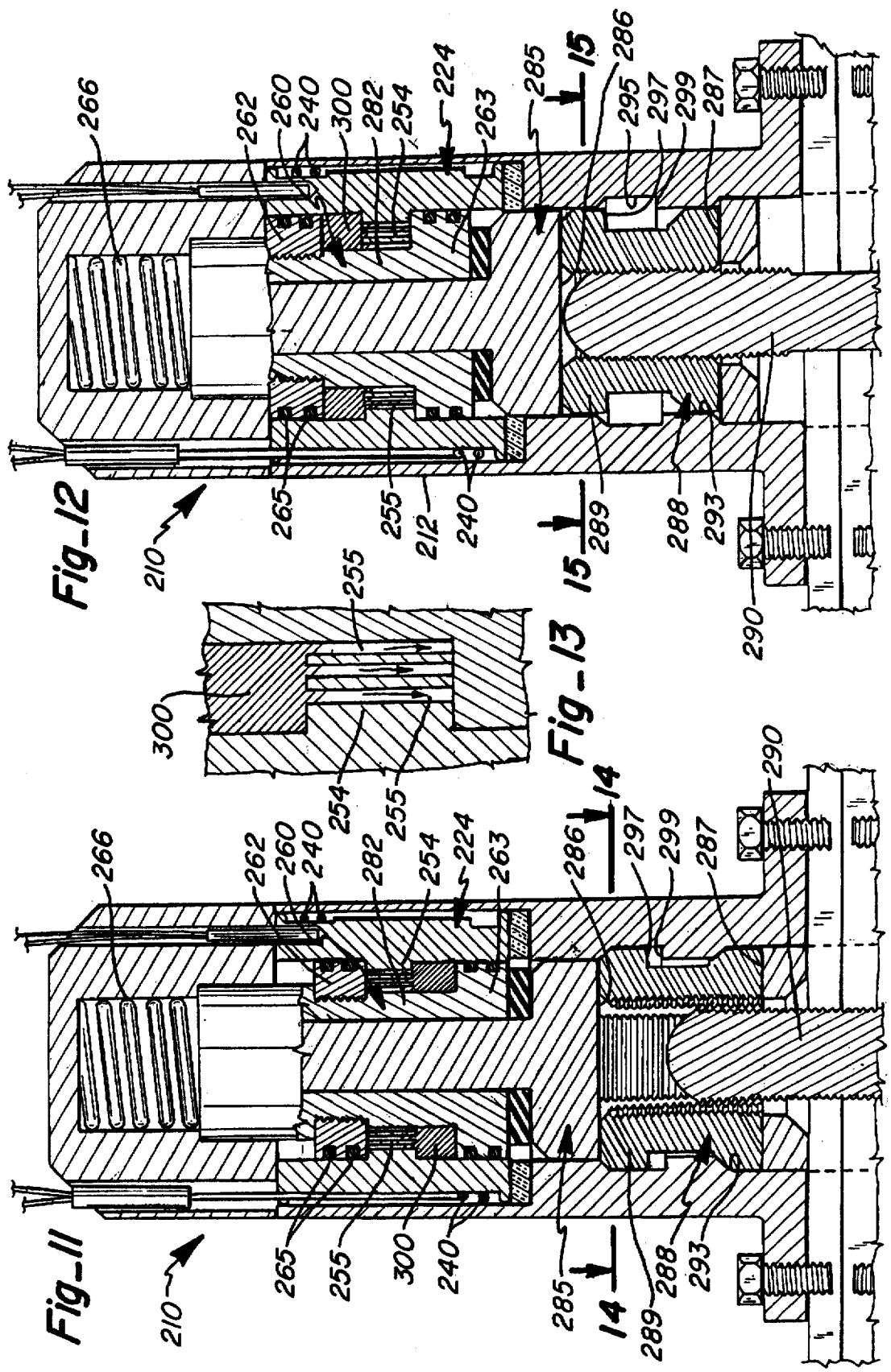

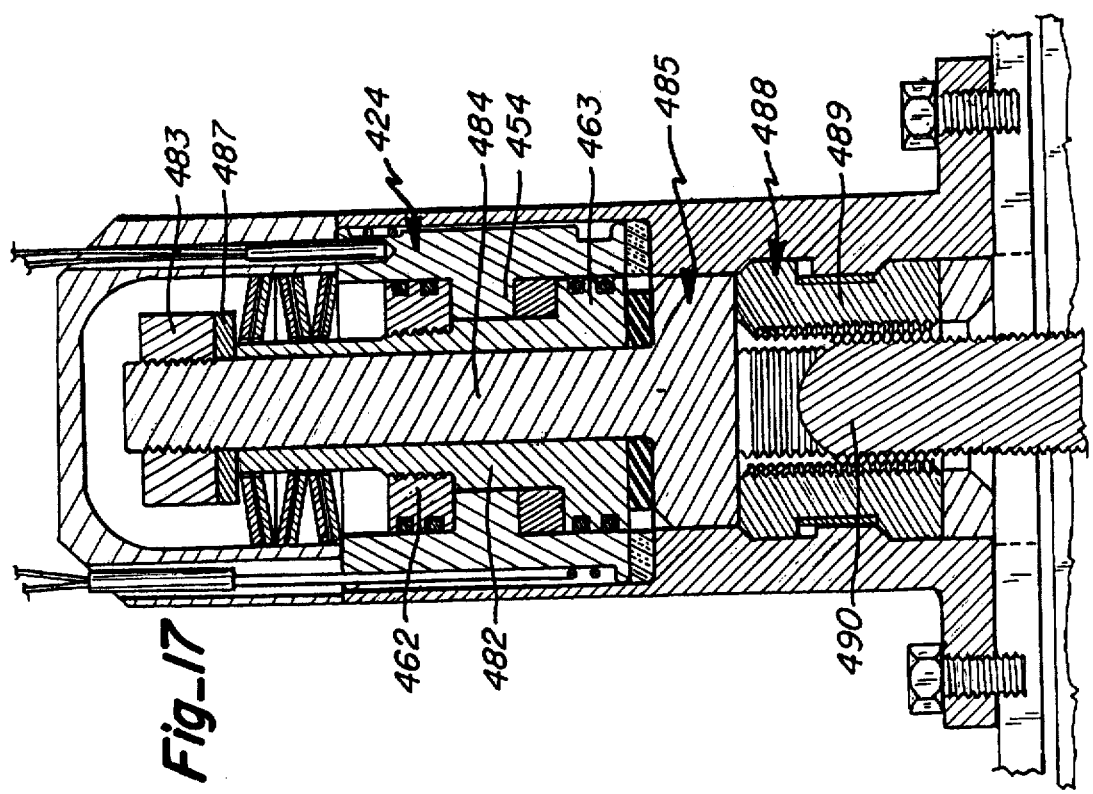
Fig_17
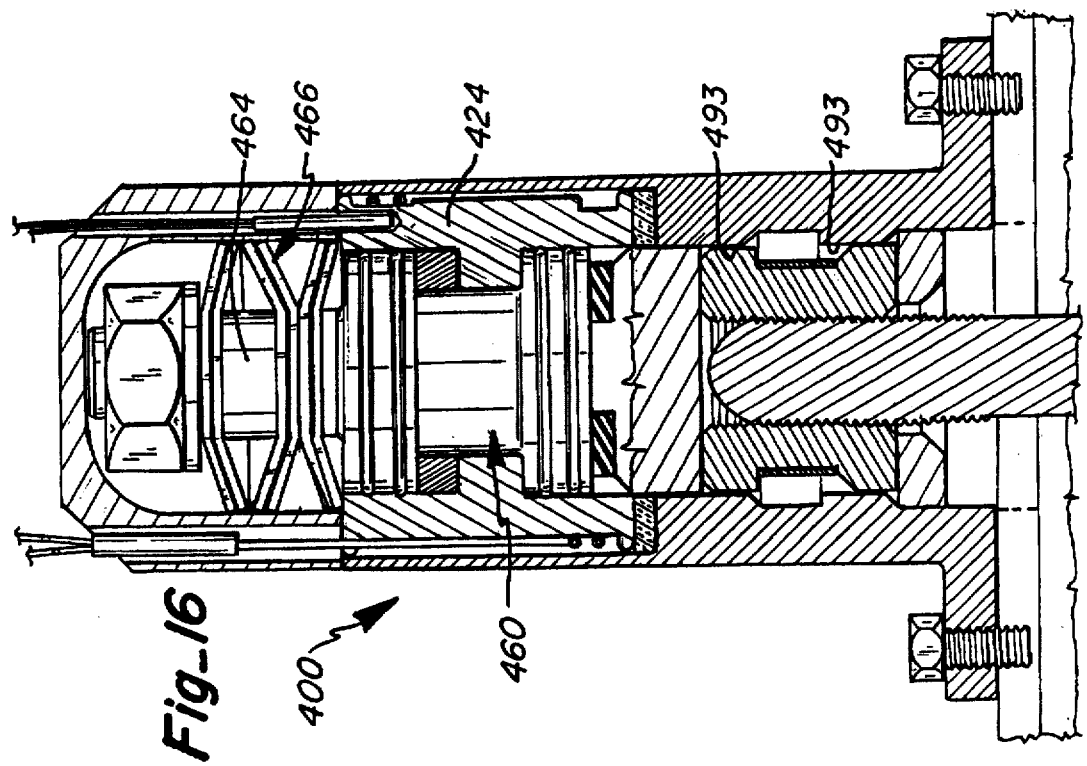
Fig_16

FUSIBLE MEMBER CONNECTION APPARATUS AND METHOD

TECHNICAL FIELD OF THE INVENTION

This invention is generally directed to non-pyrotechnically actuated separable connection apparatus, and, more particularly, to an apparatus of the above type utilizing a fusible member to provide low shock separation. An alternate expression of the disclosed invention is in the form of an apparatus configured to provide a tensioned connection between two structures.

BACKGROUND OF THE INVENTION

The hazards and other disadvantages of using pyrotechnically actuated separable connectors, or other types of separable connectors which also generate high shock loads during separation, is well known and briefly described in the background section of my prior filed U.S. patent application Ser. No. 08/420,424 entitled "Flywheel Nut Separable Connector", incorporated herein for that purpose by reference. A beneficial aspect of the non-pyrotechnically actuated design disclosed in that application is that it provides near instantaneous (on the order of 20 milliseconds) low shock separation by converting preload strain energy rapidly released during the separation into rotational kinetic energy. In many applications, however, it is desirable to have a low shock separation wherein it is not necessary or may not be desirable to have near instantaneous separation, or when other concerns such as simplicity outweigh timing concerns.

The prior art is replete with release mechanisms which use various actuation schemes to provide low shock release during separation. Examples of such release mechanisms include designs which utilize motor driven actuators, frangible link actuators, shape memory actuators, paraffin actuators, and thermal knife actuators.

U.S. Pat. No. 5,248,233 to Webster, for example, discloses a separation mechanism which provides separation in two stages. In the first stage, a titanium-nickel shape memory alloy column which has been preworked to shrink to its original length, when heated, is used to relieve the preload in a tensioned connecting bolt. In the second stage, in response to the preload having been sufficiently relieved, a biased retaining sleeve is pushed out of engagement with a segmented nut to release the connecting bolt and allow separation. A disadvantage to this apparatus is that it provides limited stroke capability relative to the length of its shape memory column because the shrinkage of the column is a relatively small percentage of the column's overall length. For applications where a relatively large stroke may be needed to relieve the preload, the limited stroke capability of the design may prevent it from achieving separation.

Similar disadvantages exist in the apparatus disclosed in U.S. Pat. No. 5,160,233, issued to McKinnis, which utilizes a shape memory alloy actuator which is preworked such that it expands when heated to translate a triggering member to release a gripping mechanism which, in turn, provides the release. A further disadvantage to this device is that it does not address the problem of rapid release of preload strain energy as shock during separation.

While motor driven designs generally provide for slow strain energy release, these systems are relatively complex. On the other hand, while paraffin actuated systems are relatively simple, they generally do not address the problem of rapid preload strain energy release during separation. This is also true of frangible link actuated systems which furthermore require replacement of the frangible link to be reset. While the thermal knife designs are both relatively simple and address the problem of rapid strain energy release, they are also not easily resettable without disassembly and are generally limited to tension preloads of 100 lbs. or less. Additionally, pads have to be replaced to reset the device after testing so that untested pads must be utilized during actual use.

In light of the above, a need exists for a simple and highly reliable non-pyrotechnically actuated design which overcomes these aforementioned and other limitations of previous non-pyrotechnic designs and which is capable of holding and gently releasing large preloads to eliminate shock loading due to rapid strain energy release. It would be particularly beneficial if such a device utilized an actuator which did not have a limited stroke and which could directly provide preload strain energy relief and shock-free separation with a simple assembly having a single critical release movement. It would further be beneficial if the device was capable of repeated use, to allow for example use of the device actual tested, and was easily resettable without disassembly or replacement of critical parts. It would additionally be beneficial if the device allowed a connecting member to be easily coupled thereto and even allowed easy coupling in the event of some misalignment between the connecting member and the device. It would also be beneficial if the device could insure separation in the event that preloading on the device was unintentionally lost prior to separation.

In some applications, two connected member do not have to be separated but rather tensioned. It would be beneficial if the present invention provided an apparatus which could be configured to act as a tensioned latching device rather than a shock-free separation apparatus.

It is the primary object of the present invention to meet the aforementioned needs with a relatively light weight and low cost design. However, other objects, features and advantages of this invention will become apparent from the following specification and the appended claims, and from the accompanying drawings illustrating the present invention in known preferred embodiments.

SUMMARY OF THE INVENTION

Accordingly, three embodiments of connection apparatus utilizing the present invention are disclosed. One embodiment of the present invention is utilized to provide shock free separation of two connected structures. The apparatus is provided with a housing and a carrier assembly is translatably supported by the housing. When an axial load is applied to it, the carrier assembly can translate between a first original axial position relative to the housing and a subsequent axial position relative to the housing. A latching mechanism is provided for engaging a connecting member to the apparatus with the carrier mechanism in the original axial position. The connection is preloaded.

In accordance with an important aspect of the present invention, a structural member is provided which is formed of a fusible alloy, i.e. an alloy capable of transitioning between solid to liquid and back to solid in response to thermal change. As a solid, the fusible alloy member is supported in the housing such that it opposes any translation inducing axial forces on the carrier assembly thereby constraining the assembly in its original axial position. It is the inventor's understanding that axial loads far greater than the yield strength of the alloy may be opposed because the alloy is experiencing akin to a hydrostatic state.

A heater is provided to heat the solid fusible member and transition it from solid to liquid such that it no longer acts to oppose the translation inducing forces. The liquid is forced out of the load path of the translation inducing loads and into at least one liquid receiving chamber.

With the fusible structural element melted out of the way, the carrier mechanism is now free to translate. As it translates, the latch mechanism releases the connecting member from the apparatus and the two structures experience a shock-free non-pyrotechnic separation. Preferably, the alloy has a melting temperature below 200 degrees centigrade and is an alloy of bismuth and lead or of bismuth and tin. The carrier assembly is attached to a piston which is seated to stroke inside a piston chamber. The piston is made from a material having a lower coefficient of thermal expansion than the material from which the piston cylinder is made. The piston cylinder, when heated by the heater radially expands relative to said piston providing an annular gap between said piston and said piston cylinder. The piston is sized to have an interference fit with the piston cylinder prior to the thermally induced radial expansion of the piston cylinder. In this manner, the structural element is prevented from undesirably extruding prior to the activation of the device. Additionally, the apparatus is preferably provided with redundant drive springs which urge the piston to stroke even in the event that preload is lost prior to separation. The latch mechanism is a socket for receiving a ball at the end of the connecting member. A control gate operates in conjunction with the socket and obstructs disengagement of the ball from the socket until the piston has stroked moving the carrier assembly to the release position. An important advantage of the apparatus is that it is completely resettable without any disassembly or replacement of components. To facilitate the resetting of the device, the control gate can move upward (it is prevented from moving downward) to a position in which it does not obstruct the engagement between the ball end of the connecting member and the socket, even with the carrier assembly in the original latch position.

In an alternate separator design incorporating the teachings of the present invention, the thermal valve (i.e., the use of different coefficients of thermal expansion to create a gap between adjoining sections of the piston and piston cylinder) is replaced with a simpler path making design more suitable for lesser pre-load applications than the first design. The internal ledge of the piston cylinder which limits the stroke of the piston is provided with a plurality of narrow through bores which, after transition, the liquid alloy may flow to a single receiving chamber. The narrowness of the through bores also minimizes any extrusion of the alloy in its solid state under load. This embodiment also provides an alternative engagement means using a number of threaded jaws which are urged against a threaded connecting member.

A third disclosed embodiment employing the teachings of the present invention is used to connect two unconnected structures and then to bring the connection between them into tension. As will be appreciated, this embodiment utilizes no pre-load (as the structures are initially separated) and reverses the direction of the force applied to the carrier assembly by the drive springs by replacing the coiled metal springs with belleville springs. The resulting urge of the piston to stoke upward caused by the belleville springs is prevented by the disposition of the structural element in the piston cylinder in a lower chamber so as to oppose an axial force in the opposite direction than in the two previous embodiments. This embodiment also uses the narrow through passageway displacement paths of the previous embodiment to allow the liquefied alloy to flow to an upper receiving chamber. Once the two structures have been connected, the upstroke of the piston will place the connection between the structures into tension.

BRIEF DESCRIPTION OF THE DRAWINGS

FIG. 1 is an enlarged partially sectioned elevation view illustrating a connection apparatus of the present invention in its latched configuration connecting two adjacent structures;

FIG. 2 is a view similar to FIG. 1, with the retraction housing more fully removed, illustrating the apparatus of FIG. 1 transitioning from a latched to an unlatched configuration;

FIG. 3 is a view similar to FIG. 2, illustrating the apparatus of FIG. 1 in a fully unlatched configuration with the connecting member released therefrom;

FIG. 6 is an exploded isometric view illustrating the apparatus of FIG. 1;

FIG. 7 is an enlarged isometric view illustrating the control gate utilized in the apparatus of FIG. 1;

FIG. 8 is a sectional view, taken along the line 8—8 in FIG. 7;

FIG. 9 is an enlarged isometric view illustrating elements of carrier assembly utilized in the apparatus of FIG. 1;

FIG. 10 is a sectional view, taken along the line 10—10 in FIG. 9;

FIG. 11 is sectioned elevation view illustrating a second embodiment during unlatching;

FIG. 12 is a view similar to FIG. 11, illustrating the second embodiment in a latched configuration;

FIG. 13 is an enlarged partial section view illustrating the small diameter channels through which the liquid alloy may flow;

FIG. 16 is a partial vertical section view illustrating a third embodiment of the present invention in a tensioned connection configuration; and FIG. 17 is a partial vertical section view illustrating the embodiment of the FIG. 16 with two separate surfaces in the process of being connected.

DETAILED DESCRIPTION OF PREFERRED EMBODIMENT

Figure 5:
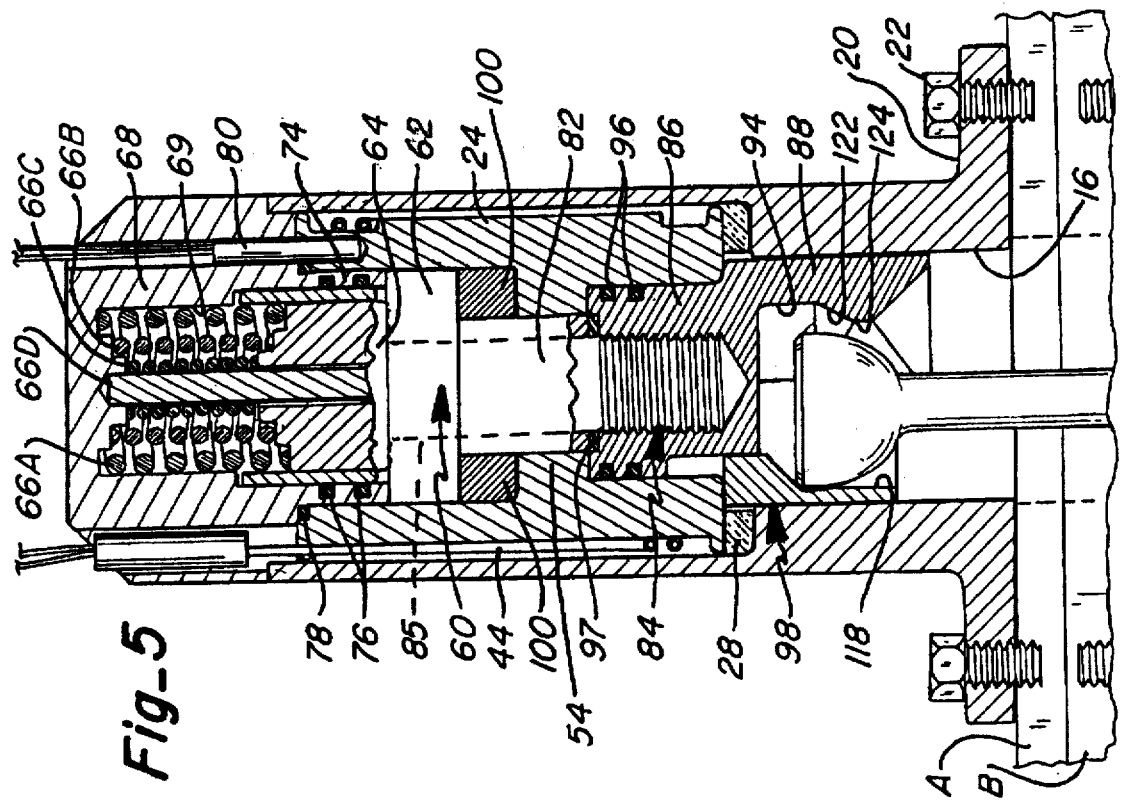
FIG. 5 is a sectional view similar to FIG. 4 illustrating the connecting member being reengaged to the apparatus of FIG. 1.
Figure 4:
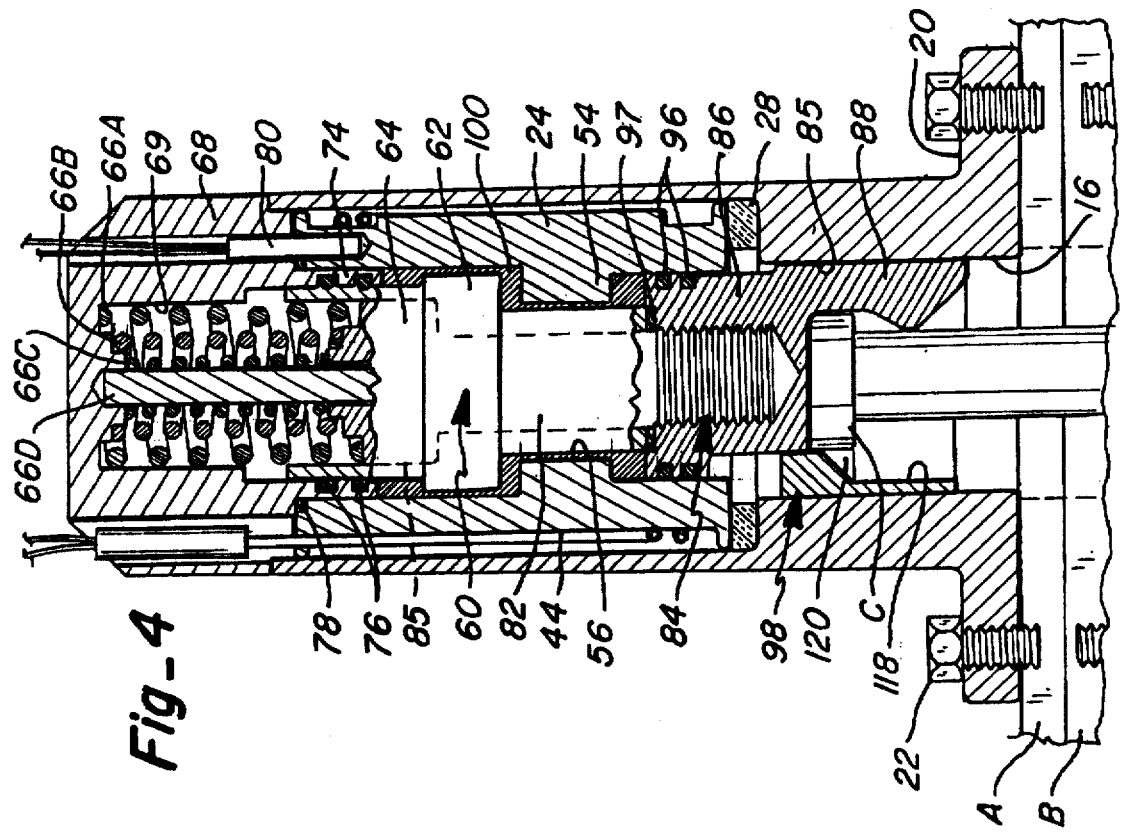
FIG. 4 is a view similar to FIG. 3 illustrating the apparatus of FIG. 1 being reset to its latched configuration.
Figure 15:
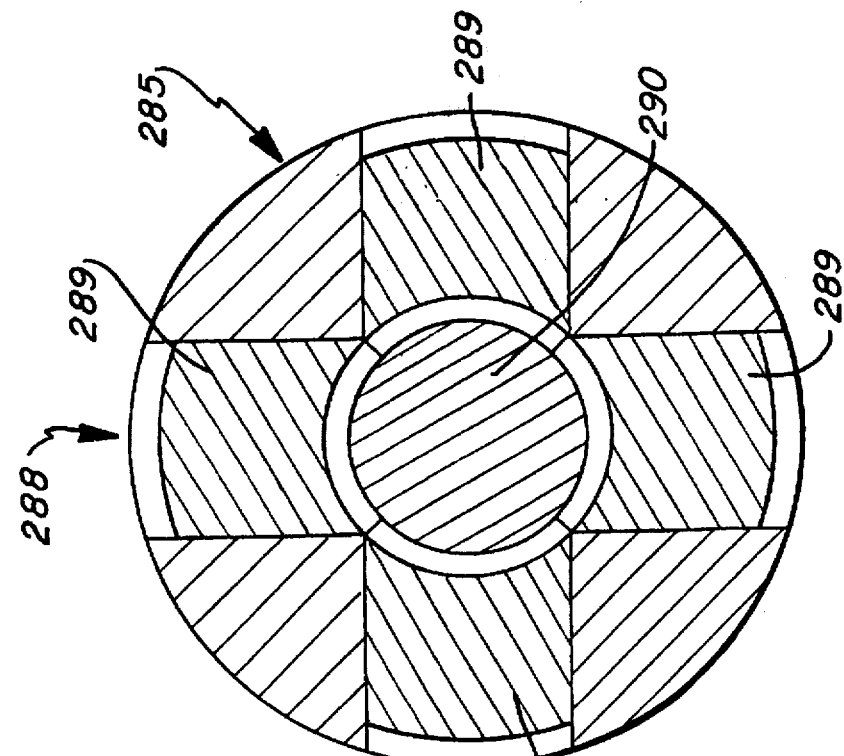
FIG. 15 is a horizontal section view, taken along the line 12—12 in FIG. 12, schematically illustrating the jaw portions in a latched configuration.
Figure 14:
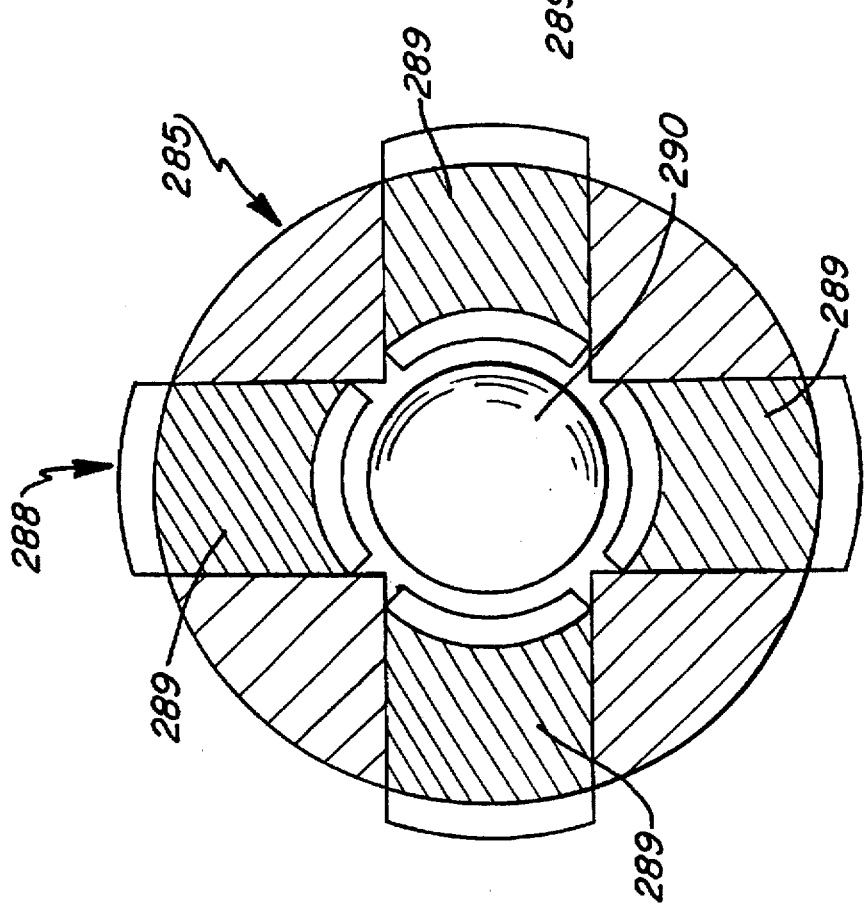
FIG. 14 is a horizontal section view, taken along the line 11—11 in FIG. 11, schematically illustrating the jaw portions in an unlatched configuration.

FIGS. 1 through 10 illustrate the present invention in the form of a preferred thermally activated separable connector 10. Apparatus 10 is used to connect and non-pyrotechnically separate structures A and B in a simple and reliable manner and without rapid strain energy release during separation. This embodiment is particularly adapted for uses where a high pre-load is applied between the two structures, on the order of 10,000 lbs.

Referring initially to FIGS. 1 through 6, the separable connector 10 is shown in FIG. 1 in its latched configuration connecting the two structures A, B. A housing 12 defines a first cylindrical passageway 14 and a second coaxial cylindrical passageway 16 having a diameter smaller than the first cylindrical passageway through an inwardly extending step 18. A perpendicularly extending mounting flange portion 20 forms a part of the housing 12 to conventionally fasten the housing to flange A as with bolts 22. The housing 12 is suitably comprised of a hard metal having poor thermal conductive properties, such as titanium. The interior wall of the housing 12 is polished to a point of thermal reflectivity and/or coated with a suitable high emissivity/low absorbtivity thermal barrier material to minimize heat loss out of the housing.

A piston cylinder 24 is laterally retained in the cylindrical passageway 14 with feet 26 extending against the interior wall of the passageway to minimize the thermally conductive path between the piston cylinder and the housing 12. The piston cylinder 24 is longitudinally supported by step 18 and rests on an annular ring 28 of a suitable thermally insulating material such as a ceramic or a high melting point hard plastic. As best shown in conjunction with FIG. 6, the external wall 32 of the piston cylinder 24 is recessed to define upper and lower lateral circumferential channels 34, 36. The projecting portion of the external wall 32 is vertically grooved to define a plurality of longitudinal radially spaced slots 38 which extend from the upper recessed channel 34 to the lower recessed channel 36. A pair of redundant swaged cable heaters 40 are seated against the external wall 32 to act as heating means for the apparatus. The heaters 40 are comprised of continuous lateral 42 and longitudinal 44 heating element portions, each of which is disposed within corresponding lateral channels 34, 36 or longitudinal slots 38. Each of the heaters 40 has a first end 46 connected to a positive terminal and a second end 49 connected to a negative terminal of a power supply (not shown) at a ceramic junction 50. While a specific heating means is disclosed, it will be appreciated that a very wide variety of suitable heating means can be successfully employed in the practice of the present invention. As will be appreciated, when the heaters are activated, heat radiated outwardly to the housing will be reflected back to the piston cylinder 24.

The piston cylinder 24, as shown in FIG. 1, has walls which define three internal coaxial passageways. The first wall 52 extends from the top of the piston cylinder 24 to the top of an inwardly projecting land 54 to define a stroke passageway. The vertical wall 56 of the land 54 defines a throat passageway, and second wall 58 extends from the bottom of the land 54 to the bottom of the piston cylinder 24 to define a release passageway.

With continued reference to FIG. 1, a piston assembly 60 is seated in the piston cylinder 24. The piston assembly 60 includes a piston head 62 which is seated in the stroke passageway and defines a spring chamber 64 integrally extending from one end of piston head. The spring chamber 64 has an open end for receiving a plurality of concentric redundant drive springs 66. As shown in FIGS. 2-9, the concentric redundant drive springs extend from the bottom surface of the spring chamber 64 to a second spring chamber 69 defined in a provided drive cap 68 and are biased to urge the piston assembly 60 to stroke. The drive cap 68 is conventionally mounted to the housing 12, as by bolts 70 threadably engagable with threaded bores 72 defined in the housing 12, to close the upper end of the piston cylinder 24. To effectuate a radial seal about the drive cap 68, an annular portion 74 of the drive cap seated between the spring chamber 64 and the piston cylinder 24 defines a pair of mutually spaced grooves, each retaining an O-ring 76. For additional sealing, a small annular groove is defined about the upper end of the piston cylinder 24 immediately adjacent the stroke passage and retains a suitable gasket 78. The drive cap also defines a plurality of passages in which the heater junctions 50 and one or more provided temperature sensor 80 are suitably lodged.

Completing the piston assembly 60, an extension portion 82 extends from the bottom of the piston head 62 and is slidably seated within the throat passageway of the piston cylinder 24. A threaded bolt 84 of suitably rigid material, and having a stepped head 85, is seated in a recess defined by the piston head 62 and extends through the extension portion 82 to threadably engage a carrier assembly 85. The bolt 84 provides tensile strength to the piston assembly 60.

The carrier assembly 85 includes a upper portion 86 translatably retained in the release passageway 58 and a lower portion 88 translatably retained in passageway 16. The lower portion 88 releasably engages a connecting member 90 by allowing the ball end 92 of the connecting member 90 to be seated within a defined socket 94 formed therein. The upper portion 86, as shown in FIGS. 2-6, defines spaced radial grooves in which O-rings 96 are retained and a detent in which gasket 97 is seated to seal the lower end of the piston cylinder 24. As will be further described, a slide gate 98, or control gate, is also supported in passageway 16 to obstruct the ball end 92 from becoming unseated from the socket 94 in the latched position of the apparatus.

Turning to FIGS. 6-10, the slide gate 98 includes longitudinal spaced back slots 102 to slidably mount the gate 98 to pins 104 extending through the housing 12. The pins 104 provide a positive stop for the slide gate to prevent it from dropping out of the housing 12. An optional lock screw 106 is engagable with a bore 108 defined in the back of the slide gate to selectively prevent the slide gate 98 from translating. The slide gate 98 also defines side slots 110 to laterally translatably restrain the slide gate on screws 112 extending through the housing 12. A spring 114 is disposed in each slot between the bottom of the slot and the screw 112 and reacts against the screw to downwardly bias the gate.

As seen in FIGS. 7 and 8, the slide gate 98 defines an upper curved surface 116 adapted to snugly partially enclose the ball end 12. The gate also defines a lower curved surface 118 stepped to a greater diameter than the upper surface 116 through radial step 120. As seen in FIGS. 9 and 10, to more readily permit the insertion of the ball end 92 into the socket 94, the lower portion 88 defines a ramp portion 126 leading to a curved guide portion 124. In this manner, the ball end may be inserted into the socket 94 even when there is misalignment between the connecting member and the carrier assembly.

In operation, the ball end 92 is seated in the ball socket 94 of the carrier assembly 85 and latched thereto by the upper surface 116 of the slide gate 98. As shown in FIG. 1, to pre-load the connection to a desired pre-load, the connecting member 90 is tensioned against retraction housing 128 conventionally utilizing a threaded nut 138 against washer 132 pinned to the retraction housing. To facilitate separation, the connecting member 90 is urged against the provided impact damper 136 by retraction springs 130. The cap 134, in this manner, absorbs the impact of the connecting bolt and retains the bolt. Optionally, an entrance damper 137 is also provided to absorb the any impact of the ball end 92 against the retraction housing 128.

Opposing the pre-load and preventing the piston assembly 60 from stroking is a fusible member 100 disposed in the space between the piston head 62 and the land 54. The fusible member is configured in a solid ring disposed about the extension portion 82 and supported by the land 54. The fusible member preferably consists of a suitable fusible alloy such as bismuth lead and bismuth tin, having melting temperatures between 124 degrees Centigrade and 175 degrees Centigrade.

The piston cylinder 24 is comprised of a material having a relatively high coefficient of thermal expansion and relatively high thermal conductivity and strength after being heated, such as 2219-T87 aluminum. When heat is applied thereto by the heating means, the piston cylinder 24 expands relative to the piston assembly 60, which is comprised of material having a relatively low coefficient of thermal expansion, such as Inco 902, Invar, or Titanium. This causes a radial gap (shown greatly exaggerated in FIGS. 2, 3, and 4) to be formed between the piston cylinder 24 and contacting points on the piston assembly 60 which is sized to provide a negative radial clearance with the piston cylinder 24 when the piston cylinder is unheated. The heat applied by the heating means the piston cylinder 24 also causes the fusible member 100 to be heated which ultimately causes the fusible member to transition to liquid. As shown in FIGS. 2 and 3, the liquid material flows through the gap formed around the piston head 62 and into the space formed between the piston head and the drive cap 68. The liquid material also flows through the gap formed around the extension portion 82 and into the space formed between the upper portion 86 of the carrier assembly 85 and the bottom of the land 54. As the melted alloy flows out of the load path of the pre-load, the piston head 62 strokes from its original position to rest against land 54. During the stroke, the preload is relieved and the carrier assembly 85 is also axially translated from its original position. Because the slide gate 98 is prevented from downward translation, the downward translation of the carrier assembly 85 allows the connecting member to toggle out of engagement with socket 94 and release from the carrier, allowing structures A and B to separate. To minimize the possibility of liquid metal embrittlement, the piston is plated with nickel or chrome and the aluminum cylinder is anodized. Nickel is preferred as it has the least impact on thermal conductance.

After the heater 40 is turned off, the radial gap closes to effectively maintain the displaced alloy in place at its collection points. To reset the device, as shown in FIG. 5, the heater is turned on to reopen the radial gap and to reheat the alloy back to its liquid state. A tool D is used to apply an upstroke force to the piston assembly 60 to translate it back to its original position relative the housing 14. This process forces the alloy to flow back through the radial gap to its original position between the piston head 62 and the land 54. When cooled back to a solid, the fusible member 100 is again ready to resist applied preload and the device is ready to be re-used.

As shown in FIG. 5, to reconnect the device to the connecting member 90, the ball end 92 of the connecting member is pressed against the slide gate 98 to push the slide gate 98 upward to an axial position in which the slide gate does not obstruct the reconnection of the connecting member to the carrier. When the ball end 92 is toggled over to be seated in the ball socket 94 carrier assembly 85, the bias of springs 114 urge the slide gate back to the position in which it obstructs the ball end 92 from unseating from the carrier until the piston is stroked.

FIGS. 11–13 show an alternate embodiment 210 implementing the present invention which is also adapted for use as a separable connector but which does not require the formation of a radial gap between the piston and the piston cylinder to create a flow path for the liquified fusible material. This embodiment also shows a second preferred connection mechanism between the connecting member 290 and the apparatus. This embodiment is more particularly suited for lower pre-load applications than the previous embodiment.

FIG. 12 shows the device in the latched configuration connecting the two structures A, B through the engagement of connecting member 290 with the carrier assembly 285. The fusible member 300 is supported in its solid state against land 254 of the piston cylinder 224 and opposes any axial force on the piston assembly 260 such as that applied by the preload or by the drive springs 266. The piston assembly 260 has an upper piston head 262 and a lower piston head 263. To facilitate assembly of the apparatus, the upper piston head 262 is not integral but is threadably engaged to a threaded portion of the neck 282 of the assembly. In the latched configuration, the upper piston head 262 bears against the solid state fusible member 300. Both the upper and lower piston heads 262, 263 preferably house adjoining redundant O-rings 265, or other sealing means, so that the radial seals formed at the upper and lower piston heads contain the fusible member material in a closed system between the piston heads. Because the radial seals must seal directly against leakage, this embodiment is preferably used for lower force applications, on the order of 1,000 lbs. of preload.

The land 254 defines a plurality of small diameter longitudinal through channels 255. The diameter of the through channels, preferably less than 0.005 in., is minimized to reduce the amount of allowable creep the solid state fusible member undergoes under load. When heat is applied from heater 240 through the piston cylinder 224 to the fusible member 300, the fusible member 300 begins to transition to liquid and upper piston head 262 will force the liquid material through the through channels 255. As shown in FIGS. 12 and 13, the liquid material collects in the area formed between the lower piston head 263 and the bottom of the land 254 by the translation of the piston assembly 260. The radial seal about the lower piston head 263 formed by the O-rings 265 contains the liquid material within the formed area.

As shown in FIGS. 11, 12, 14 and 15, the carrier assembly 285 supports within it between a first transverse wall 286 and a second transverse wall 287, an alterative connection or latch mechanism 288. The latch mechanism 288 is comprised of four jaw portions 289, each of which is translatably held in a respective transverse slot in the carrier assembly 285. A low force radial spring, not shown, is optionally used to assist maintain the jaw portions 289 together. As seen in FIG. 12, when the connecting member 290 is connected to the device, the jaw portions 289 are also retained by smaller diameter interior walls 293 of the housing 212. When the fusible member 300 is transitioned to liquid and the carrier 285 is pushed downwardly (toward surface A), the jaw portions 289 are translated into the greater diameter portion of the housing 212 defined by wall 295. The carrier 285 continues its translation until the jaw portion ledge 297 bottoms against housing ledge surface 299. Responsive to very low retraction forces, the connecting member 290 begins urges the jaw portions 289 radially outward through the wedging action between the threading on the connecting member and the threading on the jaw portions 289 until the connecting member is completely disengaged.

To reset the device, the liquified alloy is compressed back through the through channels 255 into the space formed between the upper piston head 262 and the top of the land 254 as the piston assembly is manually forced back to its original position. The threaded connecting member 290 is reengaged with the jaw potions 289. When material has transitioned back to solid, the solid ring formed will once again support the piston assembly by acting as a load bearing surface for upper piston head, and the device is ready for preload to again be applied.

A second alternative embodiment 400 which incorporates the present invention 400 is disclosed in FIGS. 16 and 17. The object of this device is not to separate the two objects but rather to allow the two objects to be connected and the connection therebetween secured and placed under axial load. The embodiment disclosed in FIGS. 16 and 17 is a modified version of embodiment 200.

Replacing the drive-spring system of the prior embodiments is a belleville spring system 466 disposed about piston extension 464 and axially supported on the piston cylinder 424. As seen in FIG. 17, the carrier assembly 485 has an extension 484 extending through the piston assembly 460 and retained thereto by threaded engagement with nut 483. The belleville spring system 466, disposed between the cylinder 424 and the nut 483 against washer 487, is biased to apply an upward axial force on the carrier 485.

The apparatus 400 is mounted to a first structure A. In operation, as shown in FIG. 17, a threaded connecting bolt 490 is attached to a second structure B which the user desires to connect to the first structure A. The connecting bolt 490 is inserted into the jaw portions 489 of the latch mechanism 488. One commercially available suitable latch mechanism for use in this embodiment is a Model 500 Zip Nut manufactured by Threaded Technology of Chantlily, Va. When fully inserted therein, the radial spring about the jaw portions (not shown) urges the jaw portions into threaded engagement with connecting bolt to form the connection between the two structures. In this latched yet untensioned position, the fusible member 500 is disposed between the lower piston head 463 and the bottom of the land 454 and opposes the upward axial force applied to the carrier assembly 485 by the belleville spring system 466. This embodiment also uses the thermal valve concept of the first embodiment wherein a radial gap is formed between the piston assembly 460 and the piston cylinder 424. As shown in FIG. 16, upon activation of the heater the fusible material transitions and the liquid material is pushed by the upwardly stroking lower piston head 463 through the radial gap formed between the vertical wall of the land 454 and the piston neck 482 into the space formed between the upper piston head 462 and the top of the land 454. The carrier 485 translates upward thus placing into tension the connection between the two structures bodies formed by the device. In the tensioned position, the jaw portions 489 are firmly retained by the smaller diameter interior wall of the housing thus insuring that the connection is maintained.

While the above invention has been shown and described in detail in this application, it should be understood that this invention is not to be limited to the exact form disclosed and changes in detail and construction of the invention may be made without departing from the spirit thereof.

I claim:

1. A connection apparatus comprising:
   a housing;
   a carrier mechanism translatably supported by said housing between an original axial position and a subsequent axial position relative to said housing responsive to an axial load on said carrier mechanism;
   means for latching a connecting member to said carrier mechanism;
   means for applying an axial load to said carrier mechanism;
   a fusible material member capable of transitioning between solid to liquid responsive to thermal change, said fusible material member in said solid state supported in said housing in a manner to oppose said axial load thereby maintaining said carrier mechanism is said original axial position; and
   heating means for transitioning said fusible material from solid to liquid;
   whereby, when said fusible member is transitioned to liquid, said carrier mechanism is free to translate from said original axial position to said subsequent axial position responsive to said axial load.

2. An apparatus, as claimed in claim 1, wherein said latch means releases said connecting member from said carrier mechanism in said subsequent axial position of said carrier mechanism.

3. An apparatus, as claimed in claim 1, wherein said fusible material comprises an alloy having a melting temperature below 200 degrees centigrade.

4. An apparatus, as claimed in claim 1, wherein said fusible material comprises an alloy of bismuth and lead.

5. An apparatus, as claimed in claim 1, wherein said fusible material comprises an alloy of bismuth and tin.

6. An apparatus, as claimed in claim 1, wherein said carrier mechanism includes:
   a piston seated in a piston cylinder; and
   a positive stop to limit the stroke of said piston.

7. An apparatus, as claimed in claim 6, further including a chamber for receiving the liquid fusible material, and wherein said positive stop defines a plurality of narrow through passages in fluid communication with said chamber.

8. An apparatus, as claimed in claim 6, further including spring means cooperating with said piston for urging said piston stroke.

9. An apparatus, as claimed in claim 8, wherein said spring means urges the piston to stroke in a direction opposite to the structure to which the apparatus is connected.

10. An apparatus, as claimed in claim 6, wherein:
    said piston comprises a material having a first selected coefficient of thermal expansion;
    said piston cylinder comprises a material having a second selected coefficient of thermal expansion greater than said first selected coefficient of thermal expansion; whereby
    said piston cylinder, when heated, radially expands relative to said piston providing an annular gap between said piston and said piston cylinder.

11. An apparatus, as claimed in claim 10, wherein said piston is sized to interference fit with said piston cylinder prior to said radial expansion of said piston cylinder.

12. An apparatus, as claimed in claim 1, further including:
    a control gate supported by said housing in a first orientation obstructing disengagement between said connecting member and said latch means with said carrier mechanism in said original axial position.

13. An apparatus, as claimed in claim 12, wherein:
    said control gate is moveable to a second orientation not obstructing disengagement between said connecting member and said latch means with said carrier mechanism is said original axial position.

14. A connection apparatus comprising:
    a connecting member;
    a piston cylinder;

a piston translatably seated within said piston cylinder responsive to an axial force;

a structural member comprised of an alloy capable of transitioning from solid to a liquid when heated and transitioning back to solid when cooled, said structural member in said solid state supported in piston cylinder to oppose said axial force and maintain said piston in an original axial position relative to said piston cylinder;

latch means for engaging said connecting member to said piston cylinder; and heating means for heating and transitioning said structural member.

15. An apparatus, as claimed in claim 14, wherein:

said piston cylinder and said piston have two dissimilar thermal coefficients of expansion so that said piston cylinder when heated radially expands relative to said piston to form at least one radial gap therebetween through which said liquid alloy may flow.

16. An apparatus, as claimed in claim 14, further comprising a chamber for receiving the liquid alloy of said structural member when transitioned, wherein said piston cylinder includes a ledge providing a positive stop to limit the stroke of said piston and said ledge defines a plurality of narrow channels in fluid communication with said chamber through which said liquid alloy may flow.

17. An apparatus, as claimed in claim 14, wherein said connecting member includes a ball shaped end and said latch means includes a ball socket adapted to seat said ball shaped end.

18. An apparatus, as claimed in claim 14, wherein said connecting member includes a threaded end and said latch means includes a plurality of threaded jaws retained by a radial spring and transversely translatable into and out of engagement with the threaded connecting member.

19. A method of connecting comprising the steps of:

translatably supporting a carrier mechanism to a housing between an original axial position relative to the housing and a subsequent axial position spaced from the odginal axial position;

engaging a connecting member to the carrier mechanism;

providing a fusible material member capable of transitioning from solid to liquid in response to thermal change;

supporting the fusible material member in the housing in its solid state to oppose axial load on the carrier mechanism to maintain the carrier mechanism in the original axial position;

applying an axial load to the carrier mechanism to translate the carrier mechanism to the subsequent axial position;

heating the fusible material to transition it from solid to liquid; and providing at least one chamber to receive said liquid material forced to flow in response to the axial load;

the carrier mechanism thus becoming free to translate from the original axial position to the subsequent axial position responsive to the axial load.

20. A method of connecting, as claimed in claim 19, comprising the further step of:

releasing the engagement of the connecting member with the carrier mechanism during the translation of the carrier mechanism from the original axial position to the subsequent axial position.

21. A method of connecting, as claimed in claim 19, comprising the further step of:

tensioning the engagement of the connecting member with the apparatus during the translation of the carrier mechanism from the original axial position to the subsequent axial position.

* * * * *